Figure 1:
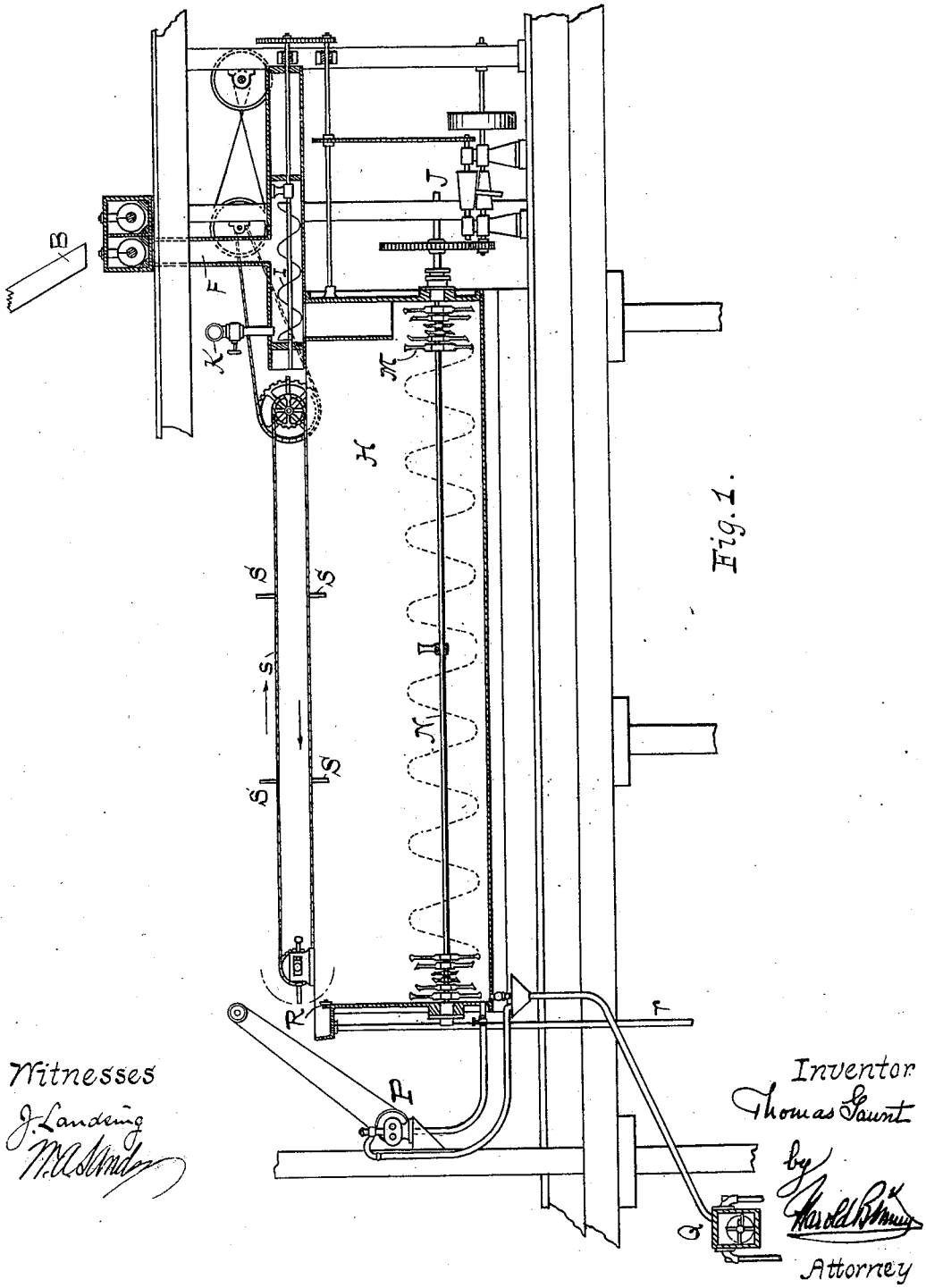

No. 664,261. Patented Dec. 18, 1900.
T. GAUNT.
DEVICE FOR SEPARATING GERMS FROM HULLS OF CORN.
(Application filed Oct. 29, 1896. Renewed May 2, 1900.)
(No Model.) 2 Sheets—Sheet 1.

Witnesses
J. Landeing
M. A. Slinde

Inventor
Thomas Gaunt
by
Harold B...
Attorney

No. 664,261. Patented Dec. 18, 1900.
T. GAUNT.
DEVICE FOR SEPARATING GERMS FROM HULLS OF CORN.
(Application filed Oct. 29, 1896. Renewed May 2, 1900.)
(No Model.) 2 Sheets—Sheet 2.
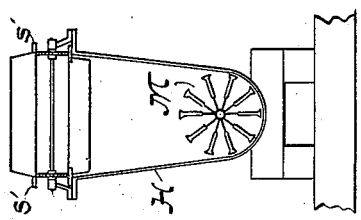
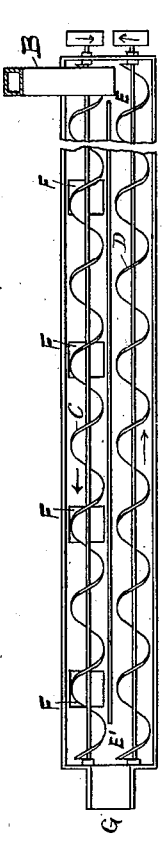
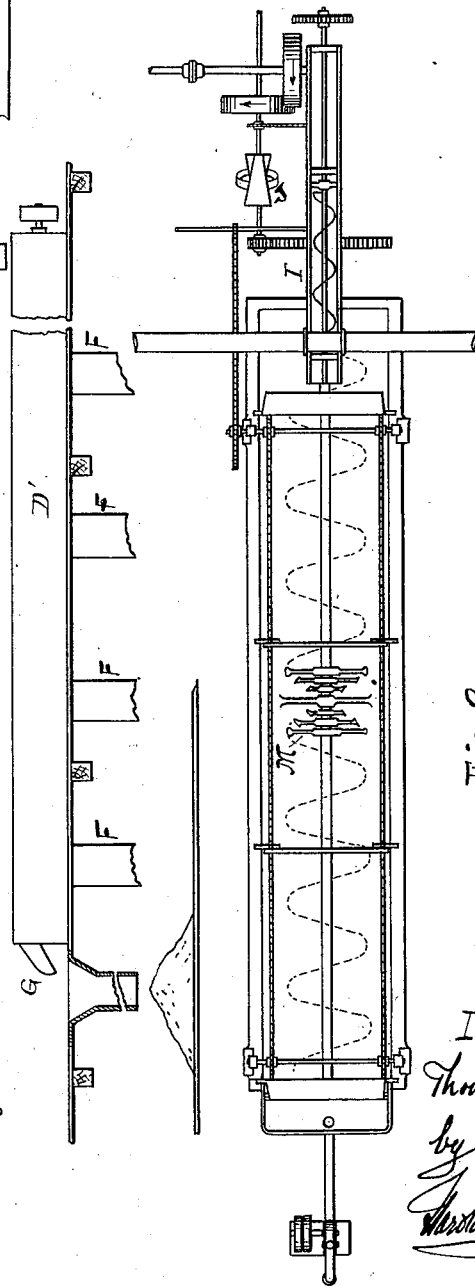

UNITED STATES PATENT OFFICE.

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

DEVICE FOR SEPARATING GERMS FROM HULLS OF CORN.

SPECIFICATION forming part of Letters Patent No. 664,261, dated December 18, 1900.

Application filed October 29, 1896. Renewed May 2, 1900. Serial No. 15,273. (No model.)

*To all whom it may concern:*

Be it known that I, THOMAS GAUNT, of Peoria, Illinois, have invented certain new and useful Improvements in Apparatus for Treating Corn, of which the following is a description, referring to the accompanying drawings, which form a part of this specification.

My invention relates particularly to the manufacture of starch, glucose, feed, corn-oil, oil-cake, and other products from corn, and, as will be seen, it is of course applicable to similar processes in treating other cereals and other materials. It is more particularly devised for operations on a large scale.

In two applications filed by me on the 1st day of September, 1896, serially numbered 604,509 and 604,510, respectively, I have described at length two new processes of treating corn, in which processes the germs are separated from the broken hulls and perisperm by flotation in a medium having a specific gravity of approximately 12° Baumé. In such a medium the hulls sink to the bottom and the germs rise to the top. The germs may be then collected from the surface of the liquid and the hulls removed from the bottom. In effecting such a separation on a large scale a number of separator-tanks, sometimes as many as ten or fifteen, may be used with advantage. Some difficulty is experienced in feeding these ten or fifteen tanks evenly with the broken hulls and germs, for the hulls and germs are not supplied at a perfectly uniform rate from the mills, threshers, squeezers, and other apparatus employed to prepare them for the separator-tank. Moreover, difficulty has been experienced in distributing the material equally to the ten or fifteen tanks, even if a constant supply from the squeezers or other apparatus immediately preceding the separators is had.

The present invention contemplates a device by which an irregular supply of material may be distributed evenly between a number of separator-tanks and fed in approximately uniform rate to each one of them, and when the material has entered the tanks it may be constantly agitated in the tanks, separated, and promptly carried through and delivered from the tank.

I am fully aware that my invention and also its several features may be used to advantage in other relations, and I describe them in connection with the separation of germs from the hulls of corn solely for convenience of illustration without meaning to limit myself to such use.

The invention is of so simple a nature that it will be readily understood from the accompanying drawings, wherein—

Figure 1 shows one of the separator-tanks in longitudinal section and the distributer therefor in transverse section. Fig. 2 is a plan view of the tank, showing a part only of the distributer. Fig. 3 is a transverse section of the tank; Fig. 4, a side elevation of my distributer, and Fig. 5 a plan view of same.

Throughout the drawings like letters of reference indicate like parts.

The distributer consists of two long parallel Archimedean-screw conveyers arranged as clearly shown in plan in Fig. 5 and extending over as many separator-tanks as may be desired. The material may be supplied to the distributer through supply-chute B. The conveyer C turns in a direction to feed the material to the left, as shown by the arrow, while the screw conveyer D feeds the material in the opposite direction. These screws may be driven in any desired manner. The conveyer-troughs C' and D' are distinct for the greater part of their length, but join at their two ends E E'. In the bottom of the conveyer C are a series of openings or chutes F, which supply the several separator-tanks, as clearly seen in Fig. 1. The slide *f* may be provided for opening or shutting these chutes. The corn or other material supplied by the chute B into the open space E is carried by the conveyer C toward the space E' and thence carried back by the screw conveyer D to the space E. By this action the material is distributed very evenly throughout the length of the conveyer. When the chutes F are all open, they each are supplied to their full capacity by the conveyer C, the last chute F getting as much as the first and the surplus being carried into the space E'. The chute B must supply enough material for all the separator-tanks that are in operation. If the supply from B is too small, one or more of the separator-tanks is stopped and the corresponding chute F closed. Considerable irregularity in the supply from the chute B has no appreciable effect upon the chutes F, any temporary excess being carried back and forth along the whole length of the distributers and held, as it were, in reserve for the moment when the chute B temporarily ceases to feed or feeds too small an amount. If the excess of supply from the chute B continues for any length of time, the surplus from both conveyers C and D overflows from the chute G and may be allowed to accumulate upon the floor, or some other suitable receptacle may be provided. From time to time the accumulation may be sent back to be again delivered by the chute B into the distributer. If any large amount is found to be flowing from the chute G, it indicates that too much is being fed from the supply-chute B. Another separator-tank may then be brought into operation, or the supply may be diminished. Preferably a small amount will continually overflow from the chute G, as that insures the full capacity of the tanks as supplied by the chutes F. If no surplus is flowing from the chute G, the supply at B should be increased or one of the separator-tanks shut off. Each of the chutes F feeds material into the separator-tank H, preferably considerably below the surface of the separator medium. A convenient additional regulation of the amount of material fed to the separator may be accomplished by the short transverse screw conveyer I, which may be driven by Evans cones J, and so controlled very accurately. The separator medium may be supplied through a pipe and valve K, which feeds directly into the descending leg from the screw conveyer I. Less disturbance of the separator medium is caused in this manner than when the separator medium is poured into the open body of the tank.

The lower portion of the tank is semicylindrical, as clearly shown in Fig. 3, and within this semicylindrical portion work the blades or arms M upon the central shaft N. These blades or arms M are preferably arranged spirally along the shaft N and are also preferably inclined to the shaft, so as to form, in fact and in effect, propeller-blades. The shaft is suitably driven, and the rotation of the blades causes the gradual advancement of the hulls and heavier materials, which sink to the bottom, and also causes a constant circulation of the separator medium, as roughly indicated by the arrows. In addition to these the corn hulls and germs are fed directly into the blades at the receiving end of the tank, and there the blades serve the additional function of breaking up and loosening the hulls from the germs. If the propeller effect of the blades M is slight, they only cause a longitudinal movement of the separator medium toward the delivery end of the tank; but if the circulating effect of these blades is greater a return current is produced near the surface of the tank and a constant circulation back and forth obtained. I prefer to adjust the speed and inclination of the several blades so that little, if any, return current is produced; but owing to the use of my skimmers or germ-blades the collection of the germs is assured whether a return current be established in the tank or not. The hulls may be drawn off from the bottom of the tank by means of pumps P, which I may term "meter-pumps," because they are designed to draw out a definite and determined amount of liquor and hulls. The liquor and hulls are delivered into the conveyer Q, which carries them to the fine grind-mills or to the other apparatus by which they are to be treated. If a determinate amount of medium is supplied by the pipe K and a determinate amount of hulls and germs by the chute F, it is clear that the overflow from the weir R will be fixed and determined by the amount drawn out by the pump P, so that all the factors of supply to and delivery from the separator-tank may be accurately measured and controlled at will. The weir R is an adjustable metal plate which may be raised and lowered to control the depth of the medium in the tank. The overflow from the weir, which consists of the germs and some of the medium, is carried off through the pipe r. The floating germs are carried along the surface of the tank to the weir R by means of the vertical blades, paddles, or skimmers S, secured to the sprocket-chains s and provided with projections s', as clearly seen in Fig. 3, which support the skimmer-blades upon the edge of the tank and slide along as the blades move toward the weir. The sprocket wheels and chains may be driven in any suitable manner, the travel of the blades preferably not exceeding a few inches per second. The germs rising to the surface are collected by these blades, carried to the weir, and pushed over the weir with the overflowing medium from the tank. The adjustment of the weir determines the depth to which the blades S enter the medium in the tank.

While I have described my invention as used in separating the germs from the hulls and perisperm of corn, it must be understood that it is applicable to the separation of any material by gravity in a suitable medium, and my distributer is applicable to the distributing of any granular or semifluid material whatever.

I claim as follows:

1. In combination with a separator-tank, conveyers arranged to feed the material in an endless path, two or more delivery devices from the said conveyers, one of which supplies the said separator-tank, means for supplying separating medium to the said tank, and means for delivering material from the bottom of the said tank and from the surface of the medium in said tank, substantially as set forth.

2. In combination with a plurality of discharge devices, the conveyer C delivering material to the said plurality of discharge devices, and a conveyer and connections therefor for returning some of the material from the rear end of the said conveyer C and redelivering it to the said conveyer C, substantially as set forth.

3. The distributer, including a plurality of mechanical conveyers, conveying material in an endless path, and a plurality of separate delivery devices from the said conveyers, whereby irregularities in the feeding of material to the said distributer may be automatically compensated for and the material more evenly fed to the said plurality of delivery devices, substantially as set forth.

4. The distributer including a plurality of conveyers feeding the material in an endless path, and means for supplying the material to the said plurality of conveyers, a plurality of chutes F opening from the said distributer and an overflow or delivery device for the surplus, substantially as set forth.

5. The distributer or feeder, including the pair of parallel conveyers C, D, feeding material in opposite directions and delivering from one to the other at each end, and a plurality of delivery-chutes therefrom, substantially as set forth.

6. In combination with a conveyer having one or more delivery-openings therefrom, means for carrying and delivering surplus material from the rear end of the said conveyer back to its receiving end, substantially as set forth.

7. In combination with a mechanical conveyer provided with one or more delivery-openings therefrom and actuated to convey the material toward a given point, a second mechanical conveyer actuated to deliver material from the said given point, and means for delivering material from one conveyer to the other at the said given point and at the other end of the said conveyers, whereby material delivered to the said conveyers at any point may travel in an endless path until delivered through the said delivery-openings, substantially as set forth.

8. In combination, a conveyer C having a plurality of discharge devices, a plurality of conveyers, I, severally receiving material from the said discharge devices and delivering the same toward several points of discharge, and means for carrying the surplus material from the rear end of the first said conveyer back to its receiving end, whereby an automatic distribution of material may be effected, substantially as described.

In testimony whereof I have hereunto set my hand.

THOMAS GAUNT.

Witnesses:
CARRIE M. GILL,
JNO. L. FRULLING.